(12) United States Patent
Lu (10) Patent No.: US 9,200,848 B2
(45) Date of Patent: Dec. 1, 2015

(54) AIR HEAT EXCHANGER

(71) Applicant: Chenfei Lu, Shanghai (CN)

(72) Inventor: Jiafu Lu, Shanghai (CN)

( * ) Notice: Subject to any disclaimer, the term of this patent is extended or adjusted under 35 U.S.C. 154(b) by 0 days.

(21) Appl. No.: 14/354,584

(22) PCT Filed: Oct. 30, 2012

(86) PCT No.: PCT/CN2012/001467
§ 371 (c)(1),
(2) Date: Aug. 6, 2014

(87) PCT Pub. No.: WO2013/063864
PCT Pub. Date: May 10, 2013

(65) Prior Publication Data
US 2014/0366815 A1    Dec. 18, 2014

(30) Foreign Application Priority Data

Oct. 31, 2011  (CN) .......................... 2011 1 0313050

(51) Int. Cl.
*F01P 7/14*     (2006.01)
*F28D 1/02*    (2006.01)
(Continued)

(52) U.S. Cl.
CPC . *F28D 1/024* (2013.01); *F01P 3/18* (2013.01); *F01P 5/06* (2013.01); *F24F 1/00* (2013.01); *F25D 17/06* (2013.01); *F28D 1/0435* (2013.01); *F28F 13/12* (2013.01); *B60K 11/04* (2013.01); *F01P 5/02* (2013.01); *F01P 7/165* (2013.01); *F01P 11/10* (2013.01); *F01P 2003/182* (2013.01); *F01P 2060/02* (2013.01);
(Continued)

(58) Field of Classification Search
CPC ......... F01P 2060/02; F01P 3/18; F01P 7/165; F01P 2003/182; F01P 5/06; F01P 11/10; F01P 5/02; B60K 11/04; F28D 1/0435; F28D 1/024; F28D 1/0461; F02B 29/0412
USPC ............ 123/41.1, 41.02, 41.31, 41.44, 41.49, 123/563; 165/140, 41; 180/68.4
See application file for complete search history.

(56) References Cited

U.S. PATENT DOCUMENTS 3,058,317 A * 10/1962 Putman .......................... 62/50.2
3,203,499 A *  8/1965 Bentz et al. .................. 180/68.4
(Continued)

FOREIGN PATENT DOCUMENTS

| CN | 102384676 A | 3/2012 |
|---|---|---|
| JP | H 08159582 A | 6/1996 |
| JP | 2000241046 A | 9/2000 |
| JP | 2006017369 A | 1/2006 |
| JP | 2008051369 A | 3/2008 |

OTHER PUBLICATIONS

International Search Report, Dec. 13, 2012, from International Phase of the instant application.

*Primary Examiner* — Marguerite McMahon
*Assistant Examiner* — James Kim
(74) *Attorney, Agent, or Firm* — Jackson Patent Law Office (57) ABSTRACT

An exemplary air heat exchanger is an engine configuration including a front heat exchange unit including a front air-to-air intercooler configured to receive a stream of air, and a front radiator connected to the front air-to-air intercooler. The engine configuration also includes a rear heat exchange unit including a rear radiator and a rear air-to-air intercooler connected to the rear radiator. An internal combustion engine is located such that the rear air-to-air intercooler is located between the engine and the front air-to-air intercooler.

3 Claims, 5 Drawing Sheets (51) Int. Cl.
  *F01P 5/06* (2006.01)
  *F24F 1/00* (2011.01)
  *F25D 17/06* (2006.01)
  *F28F 13/12* (2006.01)
  *F02B 29/04* (2006.01)
  *F28D 1/04* (2006.01)
  *F01P 5/02* (2006.01)
  *B60K 11/04* (2006.01)
  *F01P 7/16* (2006.01)
  *F01P 3/18* (2006.01)
  *F01P 11/10* (2006.01)
  *F28D 21/00* (2006.01)

(52) U.S. Cl.
  CPC ........... *F02B29/0412* (2013.01); *F28D 1/0461* (2013.01); *F28D 2001/028* (2013.01); *F28D 2021/004* (2013.01); *F28D 2021/0091* (2013.01); *F28F 2250/08* (2013.01)

(56) References Cited

U.S. PATENT DOCUMENTS

| | | | | |
|---|---|---|---|---|
| 3,377,023 | A | * | 4/1968 | Costa et al. ..................... 236/35 |
| 3,779,341 | A | * | 12/1973 | Huggins ....................... 181/225 |
| 4,236,492 | A | * | 12/1980 | Tholen .......................... 123/563 |
| 4,510,991 | A | * | 4/1985 | Kawahira ....................... 165/41 |
| 4,774,911 | A | * | 10/1988 | Yamaguchi et al. ........ 123/41.49 |
| 5,172,753 | A | * | 12/1992 | Kadle et al. ..................... 165/42 |
| 5,226,285 | A | * | 7/1993 | Dankowski ...................... 62/184 |
| 5,259,206 | A | * | 11/1993 | Dankowski ...................... 62/507 |
| 5,269,143 | A | * | 12/1993 | Cikanek et al. ................. 60/599 |
| 5,794,575 | A | * | 8/1998 | Sonnemann et al. ...... 123/41.08 |
| 5,901,786 | A | * | 5/1999 | Patel et al. ..................... 165/283 |
| 6,155,335 | A | * | 12/2000 | Acre et al. ...................... 165/41 |
| 7,178,579 | B2 | * | 2/2007 | Kolb ................................ 165/41 |
| 7,399,157 | B2 | * | 7/2008 | Tonhaeuser et al. ........ 415/173.3 |
| 2004/0108097 | A1 | * | 6/2004 | Ueda ............................... 165/42 |
| 2013/0192795 | A1 | * | 8/2013 | Gadhiraju et al. .............. 165/98 |

\* cited by examiner

AIR HEAT EXCHANGER

FIELD OF THE INVENTION

The invention relates to a heat exchanger, in particular a high-efficiency air heat exchanger used in electromechanical devices such as construction machinery, mobile vehicles, refrigerators, internal combustion engines, transformers, and large machine tools.

PRIOR ART

A heat exchanger using air and other fluids as cooling media is an indispensable device in construction machinery, mobile vehicles, internal combustion engines, small refrigerating machinery, and transformers. For example, the coolant radiator, intercooler, hydraulic oil radiator, and exhaust gas recirculation (EGR) cooler in a mobile vehicle driven by a water-cooled internal combustion engine, the forced air-cooled refrigerant condenser in small refrigerating machinery, and the air-cooled oil radiator in a large transformer all need to utilize a fan to force air to pass through the core of the cross-flow radiator transversely for heat exchange so that the heat from the cooled fluid in the radiator or condenser can be transferred out. Such air heat exchangers are mostly called radiators, air-to-air intercoolers, hydraulic oil radiators, and EGR coolers in the automobile, construction machinery, and internal combustion engine industries. The cooled fluids include coolants, compressed air, and hydraulic oils and usually no phase transition will occur relative to the cooled fluids. Air heat exchangers are also called condensers or evaporators in the refrigeration industry and phase transition will occur relative to the cooled fluid refrigerant. The working processes are all closely related to heat transfer and therefore they can all be accomplished by the above-mentioned heat exchangers.

A common heat exchanger comprises a heat exchanger core, a fan, and an air director. The fan is connected to the driving power source by means of a coupling shaft. The power source of the fan can be an electric motor or a hydraulic motor, while the power of the coupling shaft of the fan on a large mobile vehicle comes from the mechanical energy of the crankshaft pulley of the internal combustion engine. Compared with the novel heat exchanger, heat exchangers of the prior art have many disadvantages, for example, a low heat exchange efficiency, a high power consumption of the fan, and loud blowing noise. Heat exchangers of the prior art cannot be too high or too large in size because they are restricted by the layout of the main equipment.

Analyses show that existing forced convection air-cooled heat exchangers utilize only one side of the air passage to provide for cross flows, but do not utilize the space on the other side. For example, an air-blowing heat exchanger utilizes only the positive-pressure airflow passage, but does not utilize the space of the air intake passage on the other side so that it lies idle. Likewise, an air-suction heat exchanger utilizes only the negative-pressure airflow passage, but does not utilize the space on the other side.

In the cooling solutions for existing air heat exchangers, for example, an air-cooled radiator for vehicles, the speed of the fan is very high, since the heat exchange capacity of the heat dissipation system in designs for heat dissipation is usually improved by increasing the speed of the fan. Therefore, the heat exchange efficiency $\epsilon$ is low. In these solutions, air flows back into the atmosphere at a high speed, which causes a waste of kinetic energy. In addition, the efficiency of the fans is not high. When the air flow reaches a limit, an increase in the heat exchange capacity is not significant. The noise of the fans is very loud, however.

Therefore, it is very important to provide a high-performance, highly efficient heat exchanger with low power consumption. In the current situation where the prices of petroleum resources continuously increase, energy savings and reduction of power consumption are very important tasks. Noise reduction is also an important objective relative to environmental protection. The number of vehicles and small refrigerating air conditioners demanded in society is very large. Therefore, energy savings, reduction in power consumption, and noise reduction are very important, and urgently needed for highly efficient, high-performance, air-cooled heat exchangers.

DETAILED DESCRIPTION OF THE INVENTION

The invention is intended to provide a high-efficiency air heat exchanger. The noise and power consumption of the fan of the forced convection air-cooled heat exchanger can be reduced, while the heat exchange efficiency is improved. In the design of mobile vehicles, the height of the air heat exchanger can be reduced to fit. The air heat exchanger in the invention can be applied in various heat exchange situations.

The high-efficiency air heat exchanger presented in the invention comprises a front heat exchange unit, a fan, an air duct, and a rear heat exchange unit. The fan is located in the air duct. The fan and the air duct form the air blower and the air passage. The front and rear heat exchange units are installed on the upstream and downstream sides of the air passage, respectively. The front and rear heat exchange units are respectively composed of one or more superimposed heat exchange subunits. The passages for the cooled fluids of the front and rear heat exchange units are connected in series with connecting pipes of the heat exchange subunits. After the front and rear heat exchange units are connected in series, the general flow direction of cooled fluids in the passage is opposite to the direction of cooling air.

In the invention, the air blower formed by the fan and the air duct is an axial-flow, centrifugal, or mixed-flow air blower.

In the invention, the fan is connected to the power source of the fan, which can be arranged outside or inside the air passage. When the power source of the fan is located outside the air passage, the drive shaft of the fan is connected to the fan through the power takeoff aperture in the front or rear heat exchange unit and gas-sealing discs are provided in the power takeoff aperture.

Figure 1:
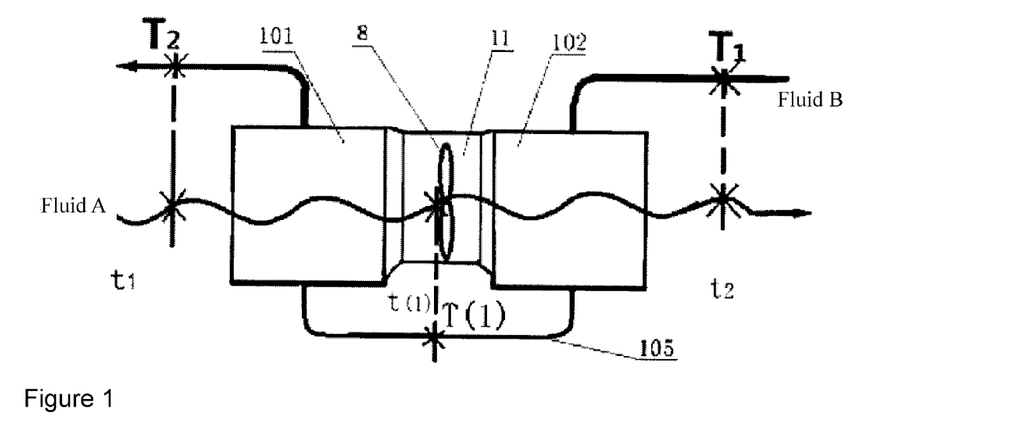
FIG. 1 shows the arrangement of the combination of two-pass counterflow and cross-flow heat exchange subunits with a built-in fan.
Figure 2:
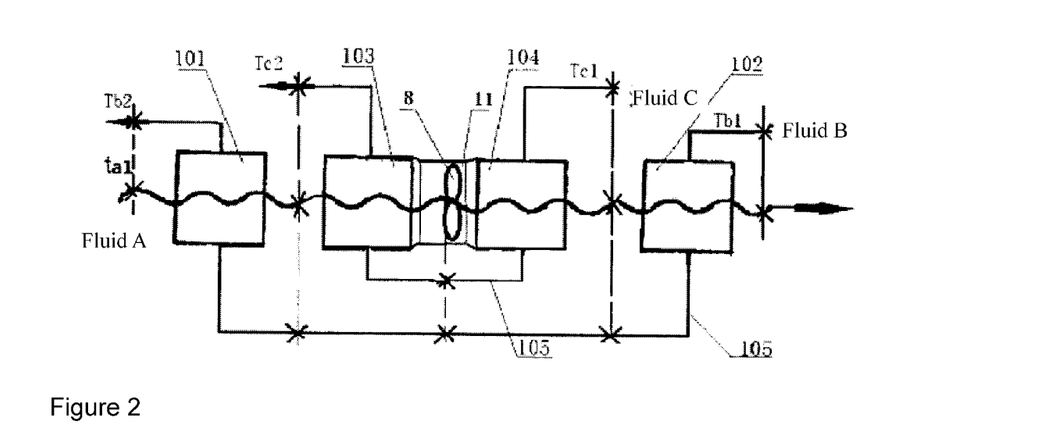
FIG. 2 shows the arrangement of the combination of two-pass counterflow and cross-flow heat exchange subunits with three fluids and a built-in fan.

The principles of the invention are as follows:

(1) Cross-flow air heat exchange subunits are installed on the end faces of the upstream and downstream sides of the air blower and are connected in series with connecting pipes. The flow direction of cooling air is opposite to the general flow direction of the cooled fluid between the front and rear heat exchange units. From a textbook, it can be leaned that the heat exchange efficiency $\epsilon$ of a two-pass counterflow and cross-flow heat exchanger is higher than that of a single-pass cross-flow heat exchanger for a given heat exchange area under the same external conditions. FIG. 1 shows the arrangement of the combination of two-pass counterflow and cross-flow heat exchange subunits with a built-in fan. FIG. 2 shows the arrangement of the combination of two-pass counterflow and cross-flow heat exchange subunits with three fluids and a built-in fan after an additional heat exchange subunit is added on each side of the fan.

In FIG. 1, heat exchange subunit 2 (102) is the front heat exchange unit, and heat exchange subunit 1 (101) is the rear heat exchange unit.

In FIG. 2, heat exchange subunit 4 (104) and heat exchange subunit 2 (102) are superimposed to form the front heat exchange unit, while heat exchange subunit 1 (101) and heat exchange subunit 3 (103) are superimposed to form the rear heat exchange unit.

Heat exchange subunits are arranged according to the requirements of the design goal. For example, the outgoing temperature Tb2 of fluid B should be lower than the outgoing temperature Tc2 of fluid C, and the incoming temperature Tb1 of fluid B should be lower than the incoming temperature Tc1 of fluid C. Obviously, $Tb2<Tc2<Tc1<Tb1$ because Tc2 is lower than Tc1. The heat exchange subunits are arranged in the sequence of heat exchange subunit 1 (101), heat exchange subunit 3 (103), heat exchange subunit 4 (104), and heat exchange subunit 2 (102). The temperatures of fluid B and fluid C satisfy the $Tb2<Tc2<Tc1<Tb1$ condition and the flow directions of fluid B and fluid C are opposite to that of fluid A.

(2) On the basis of point (1), the total heat exchange area on the air side can conveniently be increased by use of the air inlet and outlet passages at the two sides of the fan 8. From the textbook ∈-NTU method (where, ∈ refers to the efficiency of the heat exchanger and NTU refers to the number of heat transfer units) relative to the calculation curve for a two-pass counterflow and cross-flow heat exchanger, it can be found that the heat exchange efficiency ∈ can be improved greatly with a larger positive slope for a curve with the same water equivalence ratio (R) when the NTU is increased in equal proportion.

(3) The design speed of the fan 8 is reduced. The heat exchange capacity of the heat exchanger is greatly improved after the measures mentioned in point 1 and point 2 are taken. It is possible that there is a surplus heat exchange capacity of the heat exchanger after it satisfies the requirement for the equipment. Therefore, for a given thermal design, the amount of cooling air can be reduced by lowering the speed of the fan after the requirement for the equipment is satisfied. This measure can greatly reduce the power consumption and the noise pressure level of the fan 8.

(4) The fan 8 is arranged in the air passage in the heat exchanger. Such a design scheme not only can improve the efficiency of the fan, but also can reduce the external noise of the fan owing to the shielding effect. A proper design of the fan should be selected to overcome the increased blowing drag.

(5) In order for the power of the fan to be transmitted from outside of the heat exchanger in a specific embodiment, the mechanical drive shaft passes through the heat exchanger so that it passes through the power takeoff aperture in the heat exchange subunit to directly drive the fan 8; the fan 8 is located in the air duct 11 between the heat exchange units, and gas-sealing discs are provided in the power takeoff aperture to prevent the flow of air.

The benefits of the technical solution presented in the invention are: Compared with the prior art, the serial connection of the counterflows and the arrangement of heat exchange units on the upstream and downstream sides of the air passage of the fan in the technical solution in the invention make the best use of the surplus axial space, effectively increase the heat exchange capacity, improve the heat exchange efficiency, and make the heat exchanger more compact. If the heat exchange capacity of the heat exchanger exceeds the design requirement, the speed of the fan can be lowered to save energy and to reduce noise.

In the improvement design for a water-cooled heat exchanger for an automobile engine, calculations show that if the technical solution of the invention is adopted, the heat exchange efficiency of the heat exchanger is improved by about 50%, the power consumption of the fan is reduced by about 46%, the fuel consumption rate of the engine is reduced by 0.9-3.1%, and the noise pressure level of the fan is lowered by 40-50%. The payback period for investment on energy savings is less than three months.

The design schemes for the particular specifications and structure of the heat exchanger can be determined only after many factors have been taken into consideration and tests have been made.

The technical solution of the invention has the advantages of saving considerable mechanical energy and electrical energy and reducing the strength of the fan material, and can be applied to different situations. Owing to the mature technology and the low material prices, the cost can be recovered by the user in a very short period and the energy-savings benefit can be achieved. The technical solution of the invention can be widely applied in fields such as vehicle machinery and refrigerating machinery where forced-air heat exchange is required.

Description of reference numbers in the drawings: 1—Exhaust muffler of an internal combustion engine, 2—Exhaust-driven turbocharger, 3—Air outlet pipe of a compressor, 4—Air filter, 5—Outlet pipe for cooled water of the internal combustion engine, 6—Pulley of the fan, 7—Drive shaft of the fan, 8—Fan, 9—Water-radiator connecting pipe, 10—Intercooler connecting pipe, 11—Air duct, 12—Front air-to-air intercooler, 13—Front radiator, 14—Rear radiator, 15—Rear air-to-air intercooler, 16—Water inlet pipe of a pump of the internal combustion engine, 17—Air inlet pipe of the internal combustion engine, 18—Internal combustion engine, 19—Gas-sealing disc, 20—Electric motor, 21—Coupler, 22—Connecting copper pipe, 23—Front condenser, 24—Rear condenser, 101—Heat exchange subunit 1, 102—Heat exchange subunit 2, 103—Heat exchange subunit 3, 104—Heat exchange subunit 4, 105—Heat exchange subunit connecting pipe

PREFERRED EMBODIMENTS

The embodiments of the invention or the technical solution in the prior art will be described below with reference to the drawings for a description of the embodiments of the invention or the prior art. Obviously, the embodiments of the invention given in the drawings and in the following description are only examples. Without any creative work, persons skilled in the art can produce other embodiments on the basis of these drawings.

The following text describes the embodiments of the invention in detail in combination with FIG. 1 through FIG. 7. The embodiments, which are implemented on the basis of the technical solution of the invention, give detailed implementation methods and specific operating procedures. The scope of protection of the invention is not limited to these embodiments.

Embodiment 1

See FIG. 1, which shows a high-efficiency air heat exchanger comprising a heat exchange subunit 1 (101), a fan 8, an air duct 11, a heat exchange subunit connecting pipe 105, and a heat exchange subunit 2 (102). Heat exchange subunit 1 (101), heat exchange subunit 2 (102), heat exchange subunit 3 (103), and heat exchange subunit 4 (104) in FIG. 1 and FIG. 2 are all horizontally vertical-cross-flow air heat exchangers, which can be air-cooled radiators, air-to-air intercoolers, air condensers, or air evaporators. Heat exchange subunit 1 (101) and heat exchange subunit 2 (102) are connected in series with the heat exchange subunit connecting pipe 105. Owing to the negative pressure difference caused by rotations of the fan 8, cooling fluid A (cooling air) with a temperature of t1 enters heat exchange subunit 1 (101) to exchange heat with fluid B in heat exchange subunit 1 (101). After exchanging heat, cooling fluid A (cooling air) passing transversely enters the air duct 11, where cooling fluid A with a temperature of t(1) is driven by the fan 8 to enter heat exchange subunit 2 (102) to exchange heat with fluid B in heat exchange subunit 2 (102), and then flows out of heat exchange subunit 2 (102) with a temperature of t2. Fluid B with a high temperature of T1 first enters heat exchange subunit 2 (102) to exchange heat with fluid A (air) with a temperature of t(1) blown from the fan 8, and fluid B flows out of heat exchange subunit 2 (102) with a temperature of T(1). Fluid B passes through the heat exchange subunit connecting pipe (105) with a temperature of T(1) to enter heat exchange subunit 1 (101) to exchange heat with fluid A (air) with a temperature of t1, and flows out of heat exchange subunit 1 (101) with a temperature of T2.

The flow direction of cooling fluid A (air) is opposite to the general flow direction of cooled fluid B, and thus the combination of two-pass counterflow and cross-flow heat exchange subunits with a built-in fan is formed.

In FIG. 1, heat exchange subunit 2 (102) is the front heat exchange unit, and heat exchange subunit 1 (101) is the rear heat exchange unit.

Likewise, additional heat exchange subunits with different fluids can be connected in series in front of and behind the fan 8. FIG. 2 shows the combination of two-pass counterflow and cross-flow heat exchange subunits with three fluids and a built-in fan.

In FIG. 2, heat exchange subunit 4 (104) and heat exchange subunit 2 (102) are superimposed to form the front heat exchange unit, while heat exchange subunit 1 (101) and heat exchange subunit 3 (103) are superimposed to form the rear heat exchange unit.

Heat exchange subunits are arranged according to the requirements of the design goal. For example, the outgoing temperature Tb2 of fluid B should be lower than the outgoing temperature Tc2 of fluid C, and the incoming temperature Tb1 of fluid B should be lower than the incoming temperature Tc1 of fluid C. Obviously, Tb2<Tc2<Tc1<Tb1 because Tc2 is lower than Tc1. The heat exchange subunits are arranged in the sequence of heat exchange subunit 1 (101), heat exchange subunit 3 (103), heat exchange subunit 4 (104), and heat exchange subunit 2 (102). The temperatures of fluid B and fluid C satisfy the Tb2<Tc2<Tc1<Tb1 condition and the flow directions of fluid B and fluid C are opposite to that of fluid A.

Embodiment 2

Figure 3:
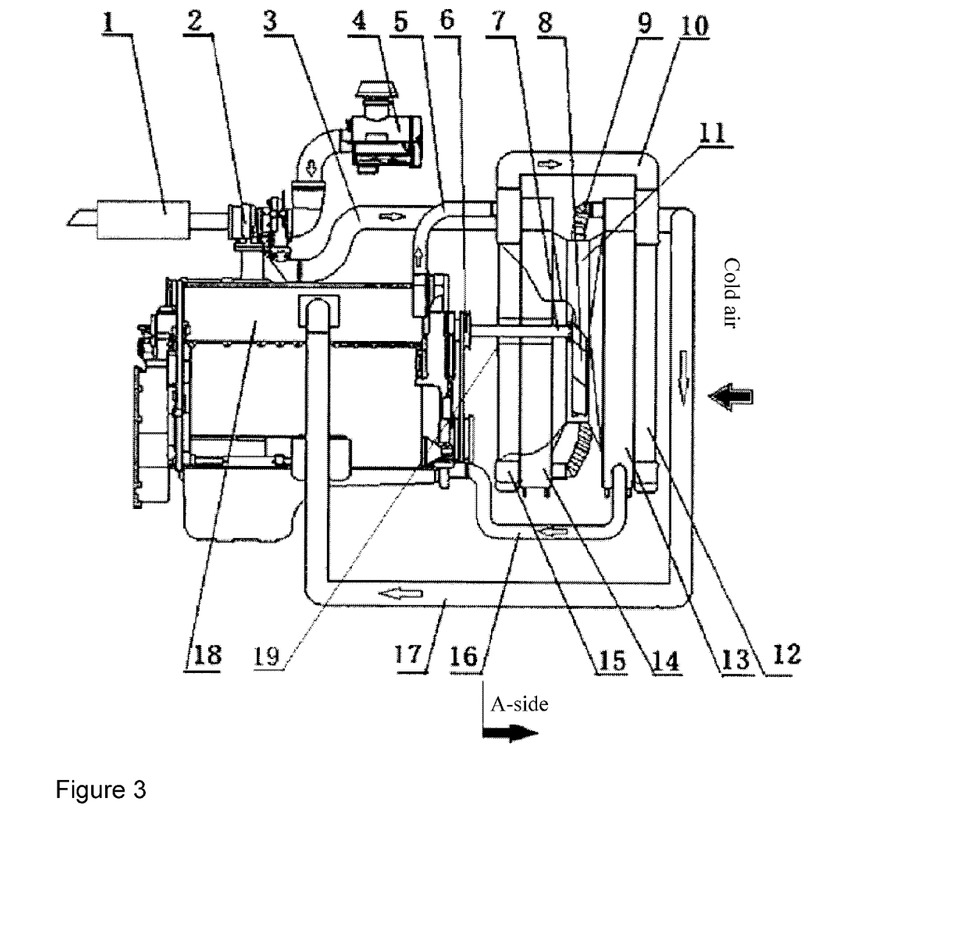
FIG. 3 shows the structure of the invention in an air radiator system for an engine for vehicle machinery.
Figure 4:
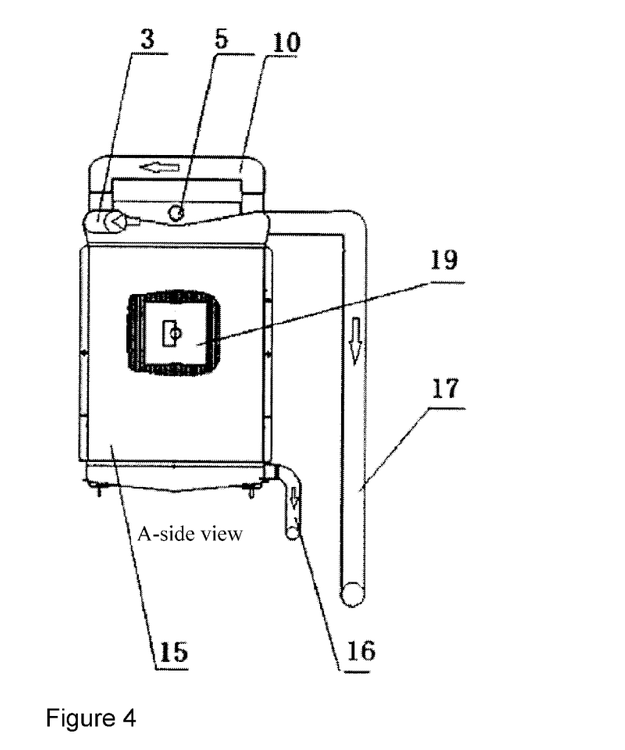
FIG. 4 shows the A-side view of the structure of the invention in the air radiator system for the engine for vehicle machinery.

A High-Efficiency Air Radiator System for Internal Combustion Engines of Vehicles Shown in FIG. 3 and FIG. 4

The high-efficiency air heat exchanger comprises an exhaust muffler 1 of the internal combustion engine, an exhaust-driven turbocharger 2, an air outlet pipe 3 of a compressor, an air filter 4, an outlet pipe 5 for cooled water of the internal combustion engine, a pulley 6 of the fan, a drive shaft 7 of the fan, a fan 8, a water-radiator connecting pipe 9, an intercooler connecting pipe 10, an air duct 11, a front air-to-air intercooler 12, a front radiator 13, a rear radiator 14, a rear air-to-air intercooler 15, a water inlet pipe 16 of a pump of the internal combustion engine, an air inlet pipe 17 of the internal combustion engine, an internal combustion engine 18, and gas-sealing discs 19. The internal combustion engine 18, the front radiator 13, the rear radiator 14, the exhaust muffler 1, and the air filter 4 are all connected to the chassis or support of the equipment. The front air-to-air intercooler 12 and the rear air-to-air intercooler 15 are respectively connected to the front radiator 13 and the rear radiator 14 by means of fastening bolts. The front radiator 13 and the rear radiator 14 are connected to the air duct 11 by means of bolts.

The front air-to-air intercooler 12 and the front radiator 13 are connected by means of a fastening bolt to form the front heat exchange unit, while the rear air-to-air intercooler 15 and the rear radiator 14 are connected by means of a fastening bolt to form the rear heat exchange unit.

The water outlet pipe of the thermostat at the front of the internal combustion engine 18 is connected to the outlet pipe 5 for the cooled water of the internal combustion engine; the outlet pipe 5 for the cooled water of the internal combustion engine is connected to the rear radiator 14; the rear radiator 14 is connected to the front radiator 13 by means of the water radiator connecting pipe 9; the front radiator 13 is connected to the water inlet pipe 16 of the pump of the internal combustion engine; and the water inlet pipe 16 of the pump of the internal combustion engine is connected to the circulating cooling pump.

The air filter 4 is connected to the air inlet of the compressor of the exhaust-driven turbocharger 2; the air outlet of the compressor of the exhaust-driven turbocharger 2 is connected to the air outlet pipe 3 of the compressor; the air outlet pipe 3 of the compressor is connected to the rear air-to-air intercooler 15; the rear air-to-air intercooler 15 is connected to the front air-to-air intercooler 12 by means of the intercooler connecting pipe 10; the front air-to-air intercooler 12 is connected to the air inlet pipe 17 of the internal combustion engine; and the air inlet pipe 17 of the internal combustion engine is connected to the air inlet pipe of the cylinder of the internal combustion engine 18. The turbine interface of the exhaust-driven turbocharger 2 is connected to the exhaust pipe of the cylinder of the internal combustion engine 18, while the turbine outlet of the exhaust-driven turbocharger 2 is connected to the exhaust muffler 1 of the internal combustion engine by means of a bolt.

The side of the pulley 6 of the fan at the front of the internal combustion engine is connected to the drive shaft 7 of the fan with multiple bolts, and the drive shaft 7 of the fan is connected to the fan 8 by means of a bolt. The drive shaft 7 of the fan passes through the rear air-to-air intercooler 15 and the power takeoff aperture in the rear radiator 14. A gas-sealing disc 19 is installed at the two ends of the power takeoff aperture to prevent a leakage of a large amount of air. A clearance must be reserved between the blades of the fan 8 and the interior wall of the air duct 11.

When the internal combustion engine 18 operates, the crankshaft pulley transmits the power to the pulley 6 of the fan via the belt. The pulley 6 of the fan drives the fan 8 by means of the drive shaft 7. The blades of the fan 8 cut off air during rotations and air flows from right to left in FIG. 3. At first, cold air horizontally enters the right side of the front air-to-air intercooler 12 from the atmosphere and passes through the core of the front air-to-air intercooler 12 to cool the high-temperature compressed gas of the fluid to be cooled; cold air also horizontally enters the right side of the front radiator 13 and passes through the core of the front radiator to cool the coolant of the internal combustion engine in the front radiator 13, and then enters the air duct 11. Driven by the fan 8, air flows to the rear radiator 14 and the rear air-to-air intercooler 15 to cool the coolant of the internal combustion engine inside the core of the rear radiator 14 and the high-temperature compressed gas inside the core of the rear air-to-air intercooler 15 in turn. After completing the cooling process, the air flows out of the left side of the rear air-to-air intercooler 15 at a certain rate to enter the atmosphere. In this way, the cooling air flow and the high-temperature compressed gas flow form two-pass counterflow and cross-flow with a fan inside the air-to-air intercoolers 12 and 15.

When the internal combustion engine 18 operates, if the temperature of the coolant in the internal circulating cooling system reaches a preset value, the thermostat valve is opened so that the high-temperature coolant of the internal combustion engine flows from the outlet pipe 5 for cooled water of the internal combustion engine to the core of the rear radiator to exchange heat with the cold air passing through the air side for the first time. The high-temperature coolant of the internal combustion engine flows out of the rear radiator 14 and passes through the water-radiator connecting pipe 9 to enter the core of the front radiator 13 to exchange heat with the cold air passing through the air side for the second time. After the coolant of the internal combustion engine is cooled twice, the temperature of the coolant drops to a certain value and the coolant is pumped back into the internal circulating cooling system of the internal combustion engine 18 after passing through the water inlet pipe 16 of the pump of the internal combustion engine. In this way, the cooling air flow and the coolant flow of the internal combustion engine form a two-pass counterflow and cross-flow arrangement with a built-in fan in the front radiator 13 and the rear radiator 14.

The pulley 6 and the drive shaft 7 of the fan, and the fan 8 are connected firmly, and the drive shaft 7 of the fan passes through the square power takeoff apertures in the air-to-air intercooler 15 and the rear radiator 14. When the internal combustion engine 18 operates, the crankshaft pulley drives the pulley 6 of the fan so that the fan 8 can rotate to drive the air to flow. A gas-sealing disc 19 is provided at the two ends of the square power takeoff apertures in the air-to-air intercooler 15 and the rear radiator 14 to prevent the flow of air. A round hole is machined in the gas-sealing discs 19 to allow the drive shaft 7 of the fan to pass through. The diameter of the aperture through which the shaft passes is slightly greater than the diameter of the drive shaft 7 of the fan. A clearance must be reserved between the blades of the fan 8 and the interior wall of the air duct 11, and the efficiency of the fan is related to the clearance.

The front air-to-air intercooler 12 and the front radiator 13 are connected with a fastening bolt to form the front heat exchange unit, while the rear air-to-air intercooler 15 and the rear radiator 14 are connected with a fastening bolt to form the rear heat exchange unit.

FIG. 3 shows a two-pass counterflow and cross-flow heat exchanger formed by two heat exchange subunits connected in series, with three fluids (a cooling-air fluid, a high-temperature compressed gas of the fluid to be cooled, and a coolant of the internal combustion engine), as well as a built-in fan.

The front radiator 13 and the rear radiator 14 in this drawing are common air-coolant, cross-flow heat exchange devices used in the industry, which can be tube-strip or tube-plate heat exchange devices and are often called water radiators in the industry, and belong to heat exchangers; the air-to-air intercooler is also a common air-air cross-flow heat exchange device in the industry, which can be a tube-strip or a plate-fin heat exchange device, and also belongs to heat exchangers. The fan is a common axial-flow fan used in the industry.

Since counterflow air-cooled heat exchange units connected in series are arranged at the upstream and downstream of the air passage of the fan, the combination of such heat exchange units has the following characteristics:

(1) When the combination of such heat exchange units is used in the manufacturing and design of the radiator system for internal combustion engines of vehicles, the multi-pass counterflow and cross-flow design scheme improves the heat exchange efficiency 6 of the system. Compared with the existing arrangement of radiators, such a design scheme will increase the heat exchange capacity for a given amount of cold air. In addition, since a radiator is provided in the space at the two sides of the fan, the total area for heat dissipation is easily greatly increased, which will increase the heat exchange capacity. The above-mentioned two measures together can greatly increase the heat exchange capacity. If there is surplus heat exchange capacity, the amount of cooling air can be reduced. Therefore, the design speed of the fan can be lowered. From the textbook, it can be learned that the airflow volume of the air blower is in direct proportion to the speed of the fan and that the power consumption and noise pressure level of the fan are in direct proportion to the third power of the speed of the fan. If the speed of the fan is lowered, the power consumption of the fan is greatly reduced by a percentage of the third power of the speed ratio. The crankshaft of the internal combustion engine can increase net power output and reduce the fuel combustion rate. If the speed of the fan is lowered, the noise pressure level of the fan is also reduced by a percentage of the third power of the speed ratio.

(2) The variables related to the radiators can be adjusted. For example, the frontal area of the radiators can be adjusted so that the heat exchanger can be suitable for a lower engine compartment; this makes the design of the overall vehicle diversified and flexible. The diameter of the fan can be reduced and the reduction in the material strength of the fan can reduce the cost.

(3) The noise of the fan can be reduced. Since the fan is located in the air duct (11) and the front and rear heat exchange units, the noise caused when the fan cuts air flows can be shielded.

The variability of the sequential arrangement and combination of the heat exchange subunits allows variation in the design scheme for the arrangement of the heat exchanger.

One or more radiators can be arranged in the front and rear air passages of the fan 8. The heat exchange subunit for one cooled fluid can be connected to an electrically controlled valve through multiple heat exchange subunit connecting pipes. Under the control of a control program, the electrically controlled valve executes the commands for serial combination, parallel combination, or closing/opening the passages of the radiators in proportion to implement the control functions of intelligently adjusting and switching the cooling capacity of the heat exchanger.

(5) The fan 8 can be an axial-flow suction fan or a blowing fan. When the blowing direction of the fan is changed, the cooling direction of the pipes is also reversed accordingly. The fan 8 in FIG. 3 is a suction fan in this case.

(6) A proper design should be selected for the fan 8 to overcome the increased blowing drag.

Embodiment 3

Figure 5:
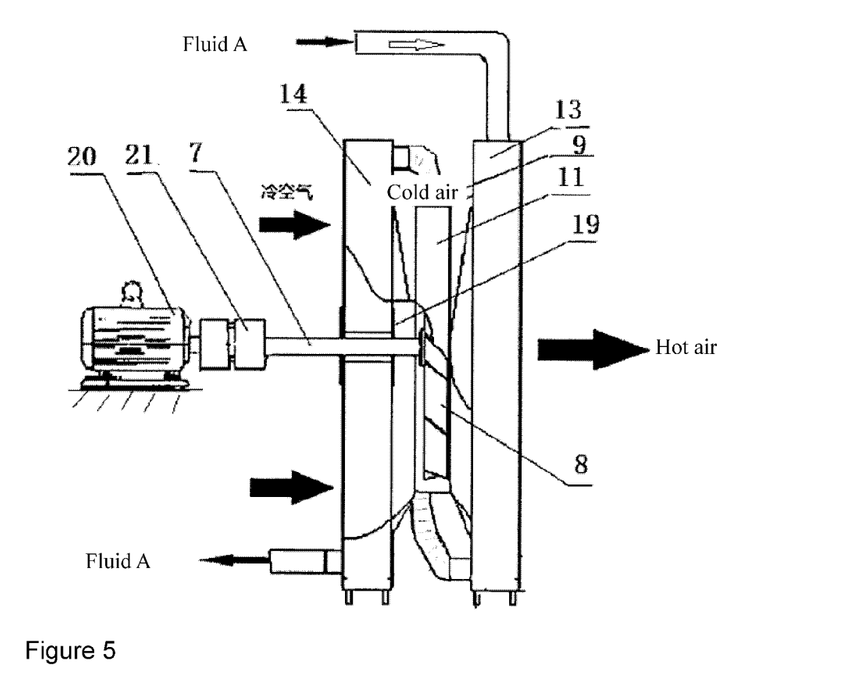
FIG. 5 shows the structure of the invention in an air radiator system for general machinery.

A High-Efficiency Air Heat Exchanger Assembly Applied in General Machinery, as Shown in FIG. 5

See FIG. 5 for the structural diagram. The electric motor 20, connected to the drive shaft 7 of the fan via the coupler 21 by means of bolts, transmits the torque to the fan 8. The blades of the fan 8 rotate in the air duct 11 to produce a positive pressure and a negative pressure in front of and behind the fan 8, respectively. Under the action of the negative pressure, the cooling air passes through the rear radiator 14 to enter the air duct 11. The air is driven by the fan 8 from left to right in FIG. 5 to enter the front radiator 13. After exchanging heat with hot fluid A in the rear radiator 14 and the front radiator 13 in turn, the hot air goes into the atmosphere on the right side. The fan 8 in FIG. 5 is a blowing fan.

Hot fluid A goes from the circulation system of the main equipment to the front radiator 13 to exchange heat with the cold air passing transversely, and then enters the rear radiator 14 to exchange heat with the cold air passing transversely. After it is cooled, fluid A goes back into the circulation system of the main equipment.

The electric motor 20 is the power source of the fan 8. In the engineering design, mechanical power sources such as a hydraulic motor, an electric motor, or a drive pulley can be selected. The fan can be an axial-flow suction fan or blowing fan. When the blowing direction of the fan is changed, the cooling direction of the pipes is also reversed accordingly.

The counterflow heat exchanger with two fluids can widely be applied to automobiles, diesel locomotives, construction machinery, transformers, and large machine tools. The cooled fluid can be a coolant, cutting fluid, or hydraulic oil.

Embodiment 4

Figure 6:
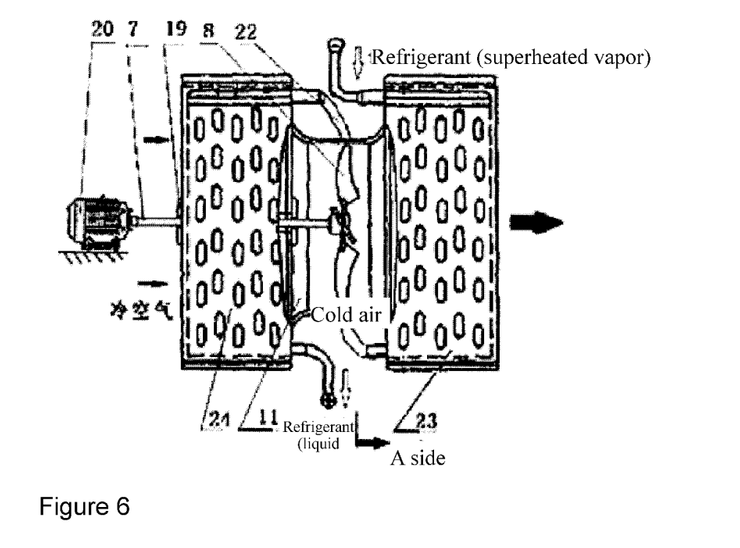
FIG. 6 shows the structure of the invention in an air condenser assembly in a small air-conditioning and refrigerating system.
Figure 7:
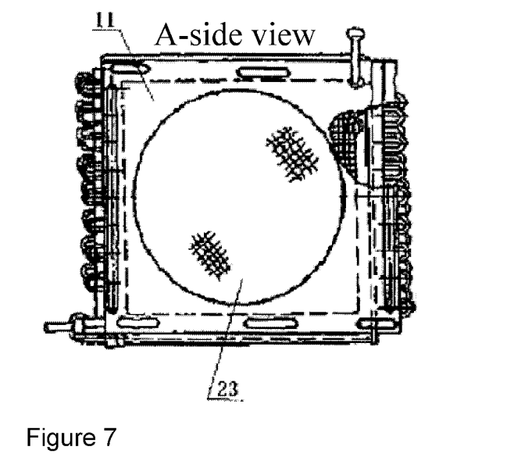
FIG. 7 shows the A-side view of the structure of the invention in the air condenser assembly in the small air-conditioning and refrigerating system.

A High-Efficiency Air Condenser Assembly for a Small Air-Conditioning and Refrigerating System as Shown in FIG. 6 and FIG. 7

See FIG. 6 for the structural diagram. An electric motor 20 transmits the torque to the fan 8 via the drive shaft 7 of the fan. The blades of the fan 8 rotate in the air duct 11 to produce a positive pressure and a negative pressure in front of and behind the fan 8, respectively. The fan in FIG. 6 is a blowing fan. Under the action of the negative pressure, the cooling air comes from the atmosphere into the rear condenser 24 and then enters the air duct 11. From left to right in FIG. 6, the air passes through the rear condenser 24, air duct 11, and front condenser 23 in turn. After exchanging heat with the refrigerant in the rear condenser 24 and in the front condenser 23, the hot air goes into the atmosphere.

The refrigerant (overheated vapor) goes from the circulation system of the main equipment to the front condenser 23 to exchange heat with the cold air passing transversely, and then passes through the connecting copper pipe to enter the rear condenser 24 to exchange heat with the cold air passing transversely. After the refrigerant is cooled, it returns to the circulation system in a liquid state.

The front condenser 23 and the rear condenser 24 are both common equipment in the industry, which can be a copper tube—fin or tube-strip condenser, and also belong to heat exchangers. Likewise, the principle can be applied to the evaporation heat exchange of refrigerants.

The condenser and evaporator assembly formed by the combination of two-pass counterflow and cross-flow heat exchangers can be widely applied to small and medium-size refrigerating and air-conditioning machinery and in other fields.

The fan can be an axial-flow suction fan or a blowing fan. When the blowing direction of the fan is changed, the cooling direction of the pipes is also reversed accordingly.

The main equipment in embodiments 2, 3, and 4 are all energy-intensive machinery in long-term service and the inventory of this equipment in society is huge. Therefore, energy savings and noise reduction are of great significance. Compared with the increase in energy consumption in modern society and the soaring energy prices in recent years, the cost of the raw materials used to save energy and manufacture the novel heat exchangers is very low and affordable. The user will greatly benefit from energy savings and will soon be paid back for the cost of the energy-saving equipment. The reduction in the noise of the fan not only can improve the quality of heat exchangers, but also brings about environmental benefits.

For example, the power consumption of the fan of a common internal combustion engine accounts for 2-7% of the total power. If the technical solution of the invention is applied, the heat exchange efficiency of a coolant radiator can be improved. The power consumption of the fan can be reduced. The noise pressure level of the fan can also be lowered.

The same is true for energy savings of the fan of a heat exchanger for construction machinery, passenger vehicles, locomotive vehicles, and transformers.

The technology of the invention can also be applied to energy savings and noise reduction of fans in the small air-conditioning and refrigeration industry to achieve significant energy savings and environmental benefits.

The invention claimed is:

1. An engine configuration comprising:
a front heat exchange unit including
a front air-to-air intercooler configured to receive a stream of air, and
a front radiator connected to the front air-to-air intercooler, the front radiator being located downstream, in the stream of air, from the front air-to-air intercooler;
an air duct downstream, in the stream of air, from the front radiator;
a fan in the air duct;
a rear heat exchange unit including
a rear radiator downstream, in the stream of air, from the air duct, and
a rear air-to-air intercooler connected to the rear radiator, the rear air-to-air intercooler being located downstream, in the stream of air, from the rear radiator;

an internal combustion engine located such that the rear air-to-air intercooler is located between the engine and the front air-to-air intercooler, the internal combustion engine including an air inlet, and exhaust output, a water inlet, and a water outlet;
a turbocharger driven by the exhaust outlet;
a pipe connecting the turbocharger to the rear air-to-air intercooler;
a pipe connecting the rear air-to-air intercooler to the front air-to-air intercooler;
a pipe connecting the front air-to-air intercooler to the air inlet;
a pipe connecting the water outlet to the rear radiator;
a pipe connecting the rear radiator to the front radiator; and
a pipe connecting the front radiator to the water inlet.

2. The engine configuration according to claim 1, wherein an air blower formed by the fan and the air duct is an axial-flow, centrifugal, or mixed-flow air blower.

3. The engine configuration according to claim 1, further including a drive shaft for the fan, the drive shaft passing through the rear air-to-air intercooler.

\* \* \* \* \*